March 7, 1967 J. E. CONROY, JR 3,307,840
CONTINUOUS CALCINATION OF GYPSUM
Filed Jan. 14, 1964 2 Sheets-Sheet 2
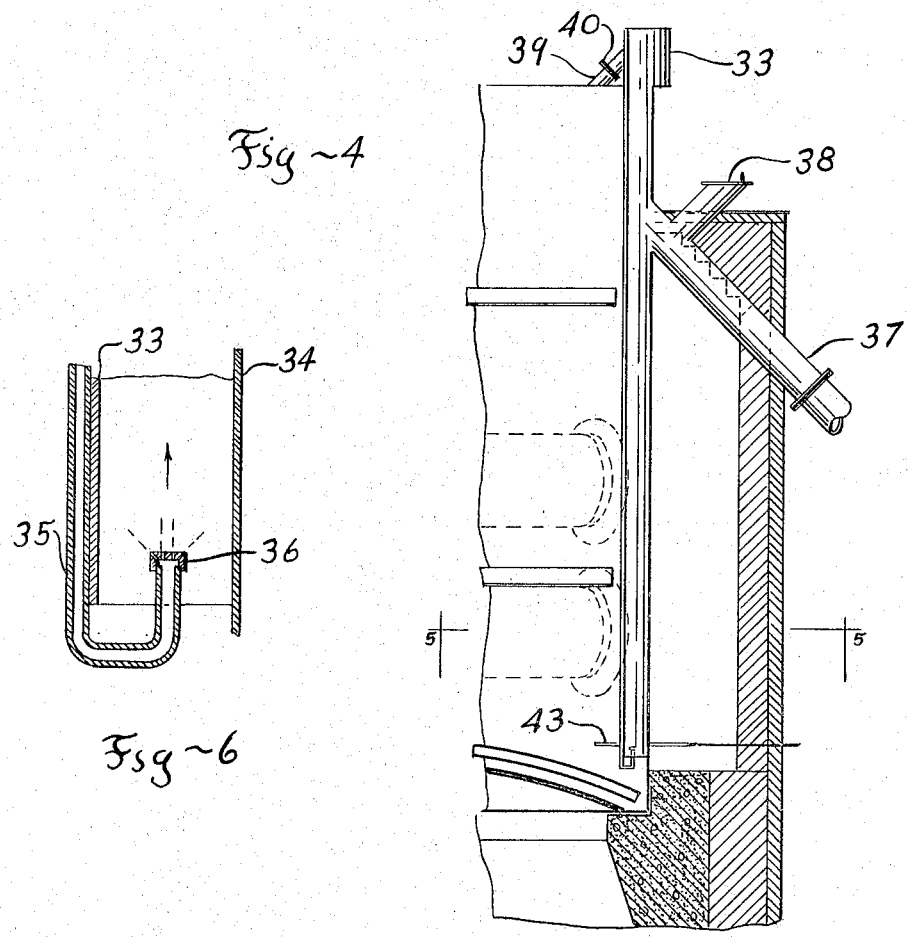
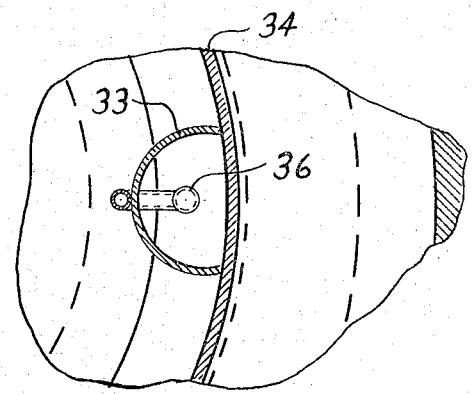
INVENTOR
Joseph E. Conroy, Jr
BY
Synnestvedt & Lechner
ATTORNEY

United States Patent Office 3,307,840
Patented Mar. 7, 1967

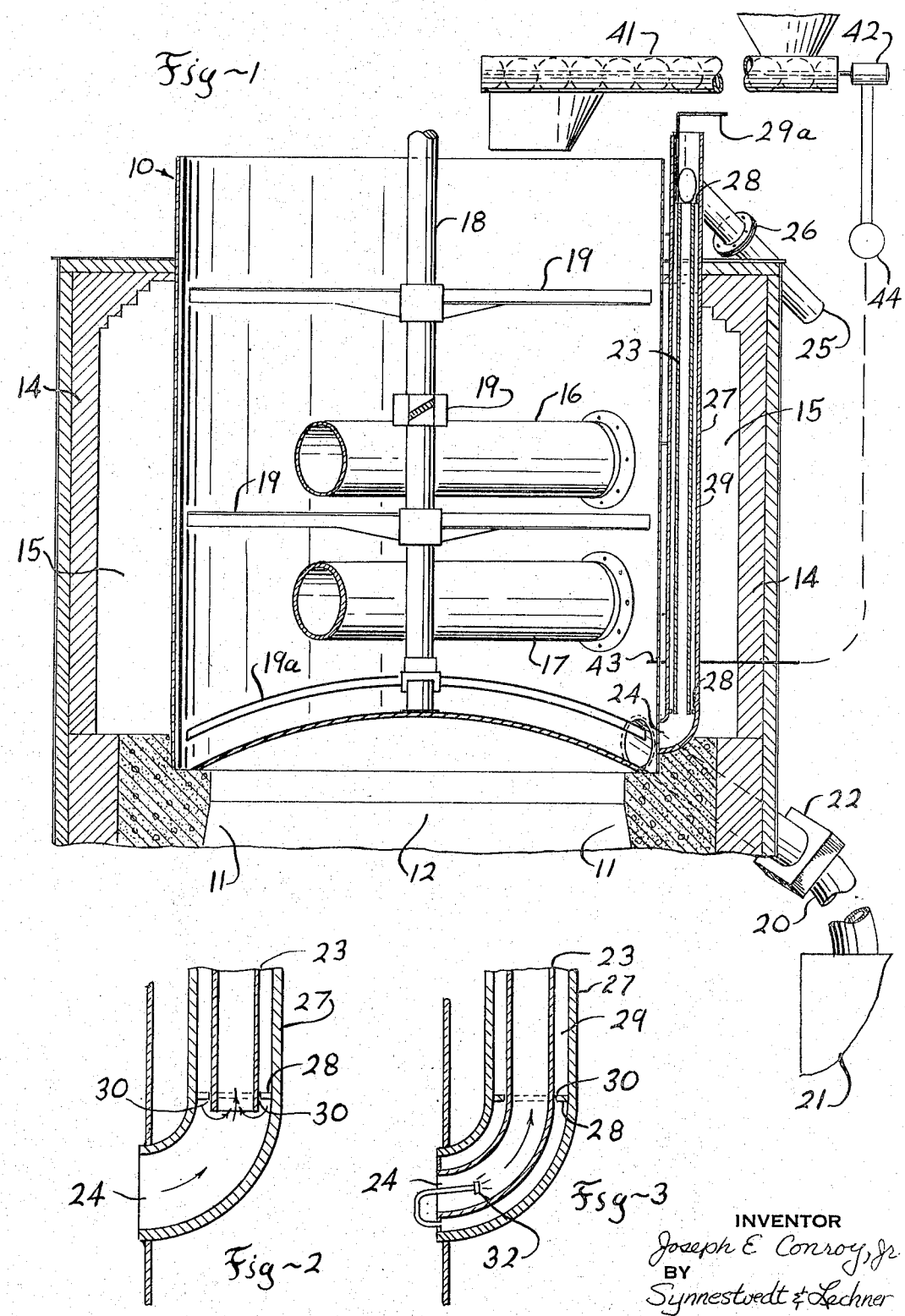

3,307,840
CONTINUOUS CALCINATION OF GYPSUM
Joseph E. Conroy, Jr., Media, Pa., assignor, by mesne assignments, to Georgia-Pacific Corporation, Portland, Oreg., a corporation of Georgia
Filed Jan. 14, 1964, Ser. No. 337,559
5 Claims. (Cl. 263—21)

This invention relates to an improved method and apparatus for calcining hydrated solid materials and more particularly to a method and apparatus for continuous calcination of gypsum in the production of plaster of Paris.

In the past, kettle-type reactors have commonly been employed for batch production of calcined gypsum and the like. This calcined material, commonly called stucco, or plaster of Paris, is primarily the hemihydrate of calcium sulphate. When recombined with sufficient water to form the dihydrate, the material forms what is known as set plaster. From an economic standpoint, the batch method of calcination, as currently practiced, is somewhat unsatisfactory for high speed, large volume production of plaster. The kettle and its supporting structure absorb large amounts of heat and much fuel is wasted between batches in maintaining the kettle temperature or in reheating a kettle that has been allowed to cool. Moreover, batch methods of production are inherently inefficient due to the amount of supervision and manual labor required for charging the kettle, controlling the temperature, and discharging each of a number of batches during a day's operations. Labor costs and time lost in heating each batch of plaster to calcining temperature, reduce the output of the kettles, and increase manufacturing costs.

While industry has long recognized the need to convert to continuous operation, prior art attempts have not gained wide acceptance for a variety of reasons. In many instances, the apparatuses and methods developed have involved such radical departures from the prior art that present equipment cannot be practically modified to carry out the new techniques. Although the need has been great, a satisfactory method of converting existing kettle type apparatus in a manner consistent with the economical production of high quality stucco, is not, to our knowledge available to the industry. Since by far the largest portion of calcined gypsum presently produced is made in these batch type kettles, the ability to continuously produce calcined gypsum of superior quality, by modifying this existing kettle equipment, is of great importance and highly desirable.

With the above in view, it is an object of this invention to provide a method and apparatus for continuously calcining gypsum of a uniform quality.

It is a further object of this invention to provide simple and efficient means for modifying conventional batch type reactors so that they can operate on a continuous basis.

Another object is to provide kettle apparatus which can be operated to yield substantial increases in production with lower fuel, maintenance, and manpower costs.

How the foregoing and various other objects of this invention are achieved will be explained more fully hereinafter in the following detailed description and in the accompanying drawings in which:

FIGURE 1 shows a kettle in accordance with the present invention;

FIGURE 2 is a detail view of the discharge standpipe shown in FIGURE 1;

FIGURE 3 shows an alternative form of the standpipe used in the form of the invention shown in FIGURE 1;

FIGURE 4 illustrates a modified form of the invention shown in FIGURE 1;

FIGURE 5 is a sectional view taken along lines 5—5 of FIGURE 4; and

FIGURE 6 is an enlarged view of the inlet of the discharge standpipe shown in FIGURE 4.

Turning now to the detailed description, FIGURE 1 shows a conventional reactor kettle 10 such as has been used in the past for calcining gypsum by the batch method. The reactor 10 shown in FIGURE 1 has been modified in accordance with one form of the present invention to carry out calcination by our continuous method. The conventional aspects of such a kettle type reactor will first be briefly described.

The reactor is conveniently constructed of steel plate and is supported in any suitable manner. The fire box walls 11 enclose the usual fire box 12, for heating the kettle. A coal, gas, or oil fed fire maintains a constant heat within the fire box shown in FIGURE 1.

Annular walls 14, conventionally formed of brick, extend upwardly around the kettle 10. The walls are spaced from the kettle a suitable distance in order to provide an annular space or chamber 15 for the passage of the hot flue gases. Flues 16 and 17 extend through the kettle, and aid in uniformly heating the mass. Partitions, not shown, are generally provided in space 15 to divert the gases through the flues. The temperature of the gases within the fire box is maintained at a sufficiently high level to properly calcine the gypsum within the kettle, generally in the neighborhood of 1800° F. to 2000° F., although this may vary somewhat.

Means are provided for agitating the mass consisting of a shaft 18 mounted for rotation within the kettle. Agitator or stirring paddles 19 and a bottom scraper 19a are attached to the shaft at spaced intervals. The shaft is preferably constantly rotated by means, not shown, to aid in the even distribution of the heat to the mass of gypsum within the kettle.

In accordance with conventional practice, the kettle is provided with a discharge spout or chute 20 extending downwardly at an angle into the hot pit 21. This chute is used to discharge the mass of stucco remaining in the kettle at the end of a continuous run and for batch operations when production needs do not warrant continuous operation. Valve means 22, of conventional construction, are provided to open and close the discharge chute.

In order to modify the kettle to carry out the objects of the invention by the embodiment shown in FIGURE 1, a vertically extending discharge standpipe 23 is placed within the annular space 15 between the flue wall and the kettle wall. The standpipe has an inlet 24 opening into the kettle near the bottom thereof, and extends upwardly generally parallel to the kettle sides. A downwardly extending discharge spout 25 joins the standpipe 23 at a point substantially at the level of the gypsum within the kettle. The spout slopes downwardly into the hot pit 21. When a mass of gysum becomes fluidized it flows out of the discharge spout 25. A valve 26 may be provided in the discharge spout 25 to shut off the pipe if it is desired to calcine by the batch method.

In the form of the invention illustrated in FIGURE 1, the standpipe 23 is surrounded with a packet 27, radially spaced from the standpipe by means of spacer plates 28 to form an annular space or chamber 29. Compressed air or other fluidizing gas is delivered to the chamber by an airline 29a. This arrangement is a very important feature of our invention. Without the jacket, especially during periods when calcined gypsum is not flowing freely through the standpipe, the hot flue gases would heat the relatively small amount of gypsum confined therein to the point where virtually all of the water is driven off, yieldg large amounts of anhydrous calcium sulphate. This anhydrous salt is produced in two forms, both of which impair the quality of the stucco. One form, sometimes called soluble anhydrite, will, when mixed with water, set rapidly and thus will significantly shorten the setting time of the plaster with which it is mixed. Another type of the anhydrous salt, formed by overheating, is known as "dead burnt" stucco and absorbs water very slowly. Varying quantities of these materials cause non-uniformity of the setting time, which of course is undesirable.

In certain other situations difficulty with packing and clogging may develop if the temperature of the material in the standpipe is not kept above the calcining temperature. In such event even more anhydrite might be produced since over calcination of the clogged material will result. This difficulty is overcome by my invention wherein the jacketed chamber 29, filled with compressed air, acts as an insulator, thereby affording a means for controlling the temperature of the material in the standpipe so that it will not rise above the point at which it will be over calcined.

During calcination, the mass within the kettle is in a highly agitated state, due both to the release of water vapor by the ground gypsum and to the action of the rotary agitators. Most of the particles within the standpipe, however, have given up the water of crystallization which is released in the formation of calcined gypsum and are not subject to the agitation imparted to the main mass by the stirring paddles 19. Because of this, the material in the standpipe tends to settle and clog the same and thereby impedes discharge. Since gypsum is continuously fed into the kettle, such a condition would tend to build up a considerable head in the kettle and, in fact, the kettle may even overflow. Even if overflowing did not occur, an intermittent discharge flow is likely to result. Furthermore, the build-up of such a pressure differential finally reaches the point where the material which is packed in the standpipe is suddenly dislodged and, as a consequence, the level of the gypsum in the kettle will tend to fall very rapidly as the stucco surges out. In practice, we have found that this process repeats itself and represents a very undesirable type of operation since the material which had settled and packed in the standpipe tends to be overcalcined. In addition, control of the discharge temperature is more difficult and closer supervision of the kettle is required.

To insure uniform flow within the standpipe, the gas used to insulate the pipe is vented into the lower section of the pipe so that it acts as a fluidizing agent. This yields an added advantage in that heated air is introduced into the stucco stream instead of cool air. In the form of the invention shown in FIGURE 2, this is simply done by providing small openings 30 in the spacer plate 28 at the lower end of the standpipe. In FIGURE 3, tubing 31, terminating in a nozzle 32, extends from the annular chamber into the standpipe.

The amount of compressed air or gas necessary to achieve these objects may be readily determined by a few field trials. An air pressure in the order of 30 p.s.i.g., delivering gas into the standpipe at a rate of 20 to 30 cubic feet per minute has been found to be satisfactory for the standpipe arrangements shown in FIGURES 2 and 3. A temperature probe may be inserted into the mass within the standpoint to help the operator arrive at the proper setting.

Exposure of the jacketed standpipe to the hot flue gases promotes informity of flow and better quality stucco in still another way. The localized heat continues to remove the water of crystallization from any remaining uncalcined material up through the mass in the standpipe thus causing further agitation which retards settling and clogging.

Referring now to the form of the invention shown in FIGURE 4, a standpipe 33 is located within the kettle adjacent the side wall 34. The standpipe is in the form of a segment of a cylinder and is secured by welding along each of its longitudinal edges to the kettle wall. One wall of the space defined by the segment and the kettle side wall is subjected to the hot flue gases. The gypsum within the kettle is, on the other hand, at about 325° F. The two temperatures modify each other to prevent over calcination or cooling and packing of the mass within the standpipe. The lower temperature of the gypsum mass surrounding the curved wall of the segment modifies the heat received through the other wall from the hot flue gases to the extent necessary to prevent the formation of a significant amount of soluble anhydrite within the standpipe. As in the previous embodiments, compressed air is injected into the standpipe near the bottom, by means of suitable tubing 35 which extends from a source of compressed air or other fluidizing gas into the standpipe entry. A suitable nozzle 36 is provided for the injection of the fluidizing agent into the mass within the standpipe. A discharge spout 37 joins the standpipe at a point near the top of the kettle. An inspection port 38 may be provided in the spout. Standpipe 33 may be provided with a vent pipe 39, having a valve 40, which is opened slightly to allow for the escape of any steam and dust which might otherwise accumulate.

In both embodiments of the invention, ground gypsum is fed into the top of the kettle from a hopper by a variable rate conveyor. While other types of conveyor apparatus may be used, I prefer a screw type conveyor 41 such as is diagrammatically shown in FIGURE 1. A variable speed drive unit 42 of conventional construction is used to drive conveyor 41. A thermostatic element or temperature probe 43 is located within the kettle adjacent the standpipe entry port. A controller 44 responds to changes of temperature above and below the optimum calcining temperature. The controller increases the speed and thus the delivery rate of conveyor 35 through the drive unit 36 as the temperature of the mass rises and decreases the rate as the temperature drops, thereby maintaining a relatively uniform temperature in the mass.

In operation, when it is desired to begin a run, the kettle is filled preferably to about ¼ full in the conventional manner. Heat from the fire raises the temperature and calcines the mass. When the temperature reaches about 300° F., the temperature controlled feed system is turned on and the temperature within the batch maintained at desired calcining temperature, usually about 325° F. The fluidizing air is also turned on at this time. As soon as the level of the mass within the kettle reaches the level of the discharge spout, stucco flows into the hot pit in a continuous stream. This process can be continued for long periods of time to yield continuous operation. When it is desired to shut down, the material remaining in the kettle is discharged through the conventional discharge gate.

The various embodiments of the invention illustrated herein provide simple and highly efficient means for the conversion of conventional kettles into continuous operation. They make possible surprising increases of production of uniform quality stucco over prior batch operations at substantial savings in operating costs.

I claim:

1. Apparatus for continuously calcining gypsum and the like, comprising a reactor kettle, means for feeding pulverized gypsum into the kettle, a source of heat for calcining the gypsum within the kettle, a flue system including a wall surrounding the kettle and spaced therefrom to form an annular heating chamber for the circulation of heating gases around the outside of the kettle walls, the gases in the chamber being at a temperature substantially higher than that of the gypsum in the kettle, control means for maintaining the gypsum within the kettle at calcining temperature, a standpipe having an inlet communicating with the kettle near the bottom thereof and having a discharge passage extending vertically upwardly parallel to the kettle side walls to a discharge point near the top of the kettle, an outwardly extending spout connected to said standpipe and communicating with said discharge passage at said discharge point, means for heating the discharge passage including a first standpipe wall in heat exchange contact with the heating gases in the heating chamber throughout at least the major portion of the height of the discharge passage and a second standpipe wall out of heat exchange contact with said heating gases to provide a temperature well below that of the heating gases, said second standpipe wall being in heat exchange contact with the gypsum in the discharge passage throughout the height of the discharge passage.

2. Apparatus according to claim 1, further including means for injecting a fluidizing gas into the inlet of the standpipe.

3. Apparatus according to claim 1 wherein the feeding means is adapted to deliver said gypsum into the top of the kettle and wherein said temperature control means includes a thermostatic element within said kettle and a feed control unit connected to said thermostatic element and responsive to changes in the temperature of the mass of gypsum whereby to control the rate of gypsum fed by the feed means.

4. Apparatus according to claim 1, wherein said standpipe is located within said annular heating chamber, and wherein said second standpipe wall is positioned within said first standpipe wall and radially spaced therefrom, means for supplying fluidizing gas into the space between said first and second standpipe walls and means for delivering the fluidizing gas within said space into the standpipe inlet.

5. Apparatus according to claim 1, wherein said second standpipe wall comprises a segmented section of a hollow cylinder secured to the kettle side wall at the edges bounding the segment.

References Cited by the Examiner

UNITED STATES PATENTS

| 1,905,089 | 4/1933 | Gough | 263—26 |
| 1,923,084 | 8/1933 | Gillette | 263—53 |
| 1,984,201 | 12/1934 | Senseman | 23—122 |
| 2,290,805 | 7/1942 | Gottschalk et al. | 263—26 |
| 2,789,034 | 4/1957 | Swaine et al. | 263—21 X |
| 2,821,375 | 1/1958 | Andrews | 263—26 |
| 3,236,509 | 2/1966 | Blair | 263—21 |

FREDERICK L. MATTESON, JR., *Primary Examiner.*

JOHN J. CAMBY, *Examiner.*

JAMES W. WESTHAVER, D. A. TAMBURRO,
*Assistant Examiners.*